US012217643B2

(12) United States Patent
Song

(10) Patent No.: US 12,217,643 B2
(45) Date of Patent: Feb. 4, 2025

(54) DISPLAY DEVICE AND METHOD OF DRIVING THE SAME

(71) Applicant: Samsung Display Co., Ltd., Yongin-si (KR)

(72) Inventor: Inbok Song, Hwaseong-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 58 days.

(21) Appl. No.: 18/075,733

(22) Filed: Dec. 6, 2022

(65) Prior Publication Data

US 2023/0237947 A1 Jul. 27, 2023

(30) Foreign Application Priority Data

Jan. 21, 2022 (KR) ........................ 10-2022-0009194

(51) Int. Cl.
*G09G 3/20* (2006.01)

(52) U.S. Cl.
CPC ....... *G09G 3/20* (2013.01); *G09G 2300/0452* (2013.01); *G09G 2310/08* (2013.01); *G09G 2360/12* (2013.01)

(58) Field of Classification Search
CPC ............. G09G 3/20; G09G 2300/0452; G09G 2310/08; G09G 2360/12
See application file for complete search history.

(56) References Cited

U.S. PATENT DOCUMENTS

| | | | | |
|---|---|---|---|---|
| 7,675,492 | B2 | 3/2010 | Park et al. | |
| 7,834,836 | B2 * | 11/2010 | Chung | G09G 3/20 345/88 |
| 2004/0081434 | A1 * | 4/2004 | Jung | G11B 27/10 386/244 |
| 2010/0256949 | A1 * | 10/2010 | Ohmori | A63F 13/55 702/160 |
| 2016/0291915 | A1 * | 10/2016 | Panchapakesan | G06F 3/1454 |

* cited by examiner

*Primary Examiner* — Sejoon Ahn
(74) *Attorney, Agent, or Firm* — CANTOR COLBURN LLP

(57) ABSTRACT

A display device includes: a display panel including a first region having a first pixel structure and a second region having a second pixel structure different from the first pixel structure, and a display panel driver configured to render first region data corresponding to the first region among input image data to generate rendering data in an inactive period of a data enable signal, and to generate data voltages applied to the first region based on the rendering data in an active period of the data enable signal.

12 Claims, 9 Drawing Sheets

DISPLAY DEVICE AND METHOD OF DRIVING THE SAME

This application claims priority to Korean Patent Application No. 10-2022-0009194, filed on Jan. 21, 2022 and all the benefits accruing therefrom under 35 U.S.C. § 119, the content of which in its entirety is herein incorporated by reference.

BACKGROUND

1. Field

Embodiments of the present invention relate to a display device and a method of driving a display device. More particularly, embodiments of the present invention relate to a display device including a display panel including a first region under which an optical module is disposed and a second region under which an optical module is not disposed, and a method of driving the display device.

2. Description of the Related Art

Generally, a display device may include a display panel, a driving controller, gate driver, and a data driver. The display panel may include a plurality of gate lines, a plurality of data lines, and a plurality of pixels electrically connected to the gate lines and the data lines. The gate driver may provide gate signals to the gate lines. The data driver may provide data voltages to the data lines. The driving controller may control the gate driver and the data driver.

The display device may include an optical module to perform an additional function. When the optical module (e.g., a camera module) is disposed under the display panel, a transmissive region may be formed in the display panel for an operation of the optical module, and pixel structure of the transmissive region and a non-transmissive region of the display panel may be different.

SUMMARY

Due to the different pixel structures, the display device may be desirable to render a part of input image data corresponding to an optical module region under which the optical module is disposed to be suitable for the different pixel structures. Due to the rendering, an output timing of the part corresponding to the optical module region and the part not corresponding to the optical module region may be different from each other.

Embodiments of the present invention provide a display device that generates rendering data in advance to match output timing of a part corresponding to a first region and a part not corresponding to the first region.

Embodiments of the present invention also provide a method of driving the display device.

According to embodiments of the present invention, a display device includes: a display panel including a first region having a first pixel structure and a second region having a second pixel structure different from the first pixel structure; and a display panel driver configured to render first region data corresponding to the first region among input image data to generate rendering data in an inactive period of a data enable signal, and to generate data voltages applied to the first region based on the rendering data in an active period of the data enable signal.

In an embodiment, an optical module may be disposed under the first region.

In an embodiment, a total number of pixels per unit area of the first pixel structure may be smaller than a total number of pixels per unit area of the second pixel structure.

In an embodiment, the display panel driver may be configured to render the first region data in a back porch period of the inactive period.

In an embodiment, the display panel driver may include: a frame memory device configured to store the input image data; a renderer configured to render the first region data in the inactive period to generate the rendering data; and a rendering memory device configured to store the rendering data.

In an embodiment, the renderer may include: a rendering operator configured to render the first region data, and a selector configured to selectively output the rendering data or the input image data.

In an embodiment, the display panel driver may further include a sub-memory device configured to receive the input image data and store the first region data of the input image data.

In an embodiment, the frame memory device may be configured to output the first region data to the renderer.

In an embodiment, the frame memory device may be configured to output the first region data to the rendering memory device, and the rendering memory device may be configured to output the first region data to the renderer.

According to embodiments of the present invention, a display device includes: a display panel including a first region having a first pixel structure and a second region having a second pixel structure different from the first pixel structure; and a display panel driver configured to render first region data corresponding to the first region among input image data to generate rendering data in a first period of an active period of a data enable signal, and to generate data voltages applied to the first region based on the rendering data in a second period of the active period of the data enable signal after the first period.

In an embodiment, an optical module may be disposed under the first region.

In an embodiment, a total number of pixels per unit area of the first pixel structure may be smaller than a total number of pixels per unit area of the second pixel structure.

In an embodiment, the display panel driver may include a frame memory device configured to store the input image data, a renderer configured to render the first region data in the first period to generate the rendering data, and a rendering memory device configured to store the rendering data.

In an embodiment, the renderer may include: a rendering operator configured to render the first region data, and a selector configured to selectively output the rendering data or the input image data.

In an embodiment, the display panel driver may further include a sub-memory device configured to receive the input image data and store the first region data of the input image data.

In an embodiment, the frame memory device may be configured to output the first region data to the renderer.

In an embodiment, the frame memory device may be configured to output the first region data to the rendering memory device, and the rendering memory device may be configured to output the first region data to the renderer.

According to embodiments of the present invention, a method of driving a display device includes: storing input image data in a frame memory device; rendering first region data corresponding to an optical module region under which an optical module is disposed among the input image data to generate rendering data in an inactive period of a data enable signal; storing the rendering data in a rendering memory device; and selectively outputting the rendering data or the input image data in active period of the data enable signal.

In an embodiment, a pixel structure of the optical module region may be different from a pixel structure of a normal region under which the optical module is not disposed.

In an embodiment, rendering the first region data is performed in a back porch period of the inactive period.

Therefore, the display device may generate rendering data in advance in an inactive period (or in a first period of an active period) of a data enable signal by rendering first region data corresponding to the first region among input image data, and generating data voltages applied to the first region based on the rendering data in the active period (or in a second period of the active period of the data enable signal after the first period) of the data enable signal. Accordingly, the display device may match output timing of a part corresponding to a first region and a part not corresponding to the first region.

In addition, the method of driving the display device may match output timing of a part corresponding to a first region and a part not corresponding to the first region.

However, the effects of the present invention are not limited to the above-described effects, and may be variously expanded without departing from the spirit and scope of the present invention.

DETAILED DESCRIPTION

It will be understood that, although the terms “first,” “second,” “third” etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, “a first element,” “component,” “region,” “layer” or “section” discussed below could be termed a second element, component, region, layer or section without departing from the teachings herein.

The terminology used herein is for the purpose of describing particular embodiments only and is not intended to be limiting. As used herein, “a”, “an,” “the,” and “at least one” do not denote a limitation of quantity, and are intended to include both the singular and plural, unless the context clearly indicates otherwise. For example, “an element” has the same meaning as “at least one element,” unless the context clearly indicates otherwise. “At least one” is not to be construed as limiting “a” or “an.” “Or” means “and/or.” As used herein, the term “and/or” includes any and all combinations of one or more of the associated listed items. It will be further understood that the terms “comprises” and/or “comprising,” or “includes” and/or “including” when used in this specification, specify the presence of stated features, regions, integers, steps, operations, elements, and/or components, but do not preclude the presence or addition of one or more other features, regions, integers, steps, operations, elements, components, and/or groups thereof. Hereinafter, the present invention will be explained in detail with reference to the accompanying drawings.

Figure 1:
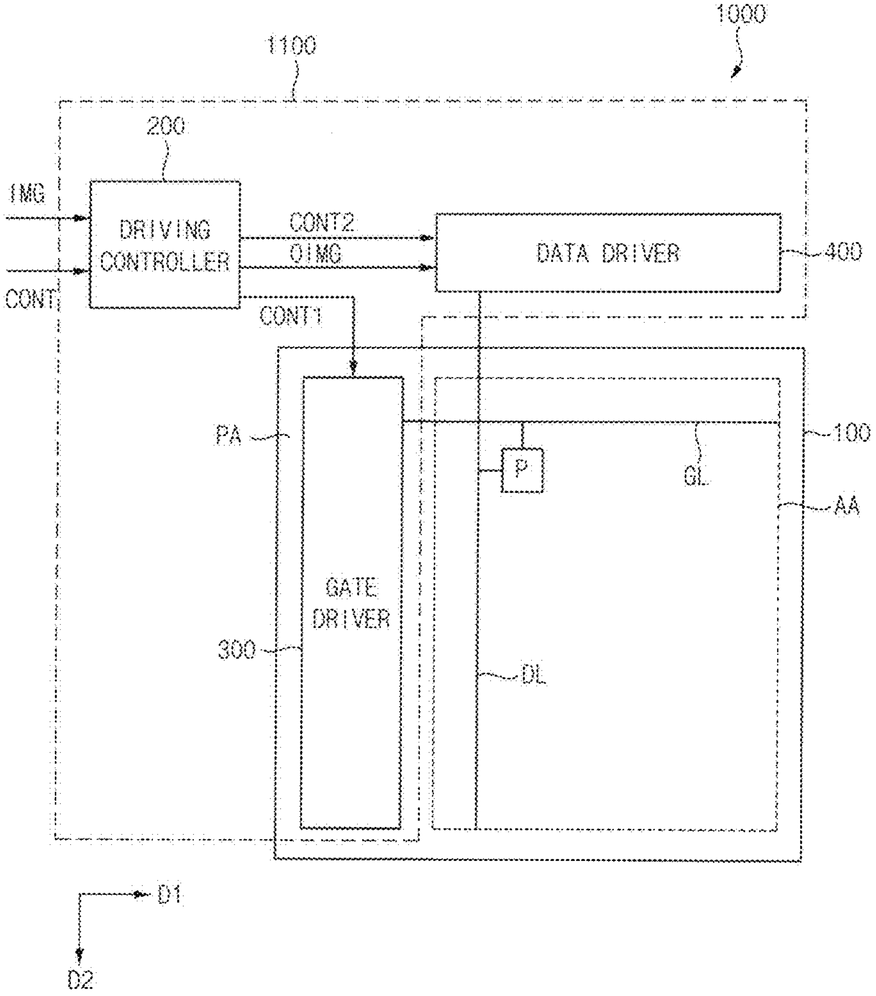
FIG. 1 is a block diagram illustrating a display device according to embodiments of the present invention.

FIG. 1 is a block diagram illustrating a display device 1000 according to embodiments of the present invention.

Referring to FIG. 1, the display device 1000 may include a display panel 100 and a display panel driver 1100. The display panel driver 1100 may include a driving controller 200, a gate driver 300, and a data driver 400. In an embodiment, the driving controller 200 and the data driver 400 may be integrated into one chip.

The display panel 100 has a display region AA on which an image is displayed and a peripheral region PA adjacent to the display region AA. In an embodiment, the gate driver 300 may be mounted on the peripheral region PA of the display panel 100.

The display panel 100 may include a plurality of gate lines GL, a plurality of data lines DL, and a plurality of pixels P electrically connected to the data lines DL and the gate lines GL. The gate lines GL may extend in a first direction D1 and the data lines DL may extend in a second direction D2 crossing the first direction D1.

The driving controller 200 may receive input image data IMG and an input control signal CONT from a host processor (e.g., a graphic processing unit; “GPU”). For example, the input image data IMG may include red image data, green image data and blue image data. In an embodiment, the input image data IMG may further include white image data. For another example, the input image data IMG may include magenta image data, yellow image data, and cyan image data. The input control signal CONT may include a master clock signal and a data enable signal. The input control signal CONT may further include a vertical synchronizing signal and a horizontal synchronizing signal.

The driving controller 200 may generate a first control signal CONT1, a second control signal CONT2, and output image data OIMG based on the input image data IMG and the input control signal CONT.

The driving controller 200 may generate the first control signal CONT1 for controlling operation of the gate driver 300 based on the input control signal CONT and output the first control signal CONT1 to the gate driver 300. The first control signal CONT1 may include a vertical start signal and a gate clock signal.

The driving controller 200 may generate the second control signal CONT2 for controlling operation of the data driver 400 based on the input control signal CONT and output the second control signal CONT2 to the data driver 400. The second control signal CONT2 may include a horizontal start signal and a load signal.

The driving controller 200 may receive the input image data IMG and the input control signal CONT, and generate the output image data OIMG. The driving controller 200 may output the output image data OIMG to the data driver 400.

The gate driver 300 may generate gate signals for driving the gate lines GL in response to the first control signal CONT1 input from the driving controller 200. The gate driver 300 may output the gate signals to the gate lines GL. For example, the gate driver 300 may sequentially output the gate signals to the gate lines GL.

The data driver 400 may receive the second control signal CONT2 and the output image data OIMG from the driving controller 200. The data driver 400 may convert the output image data OIMG into data voltages having an analog type. The data driver 400 may output the data voltage to the data lines DL.

Figure 2:
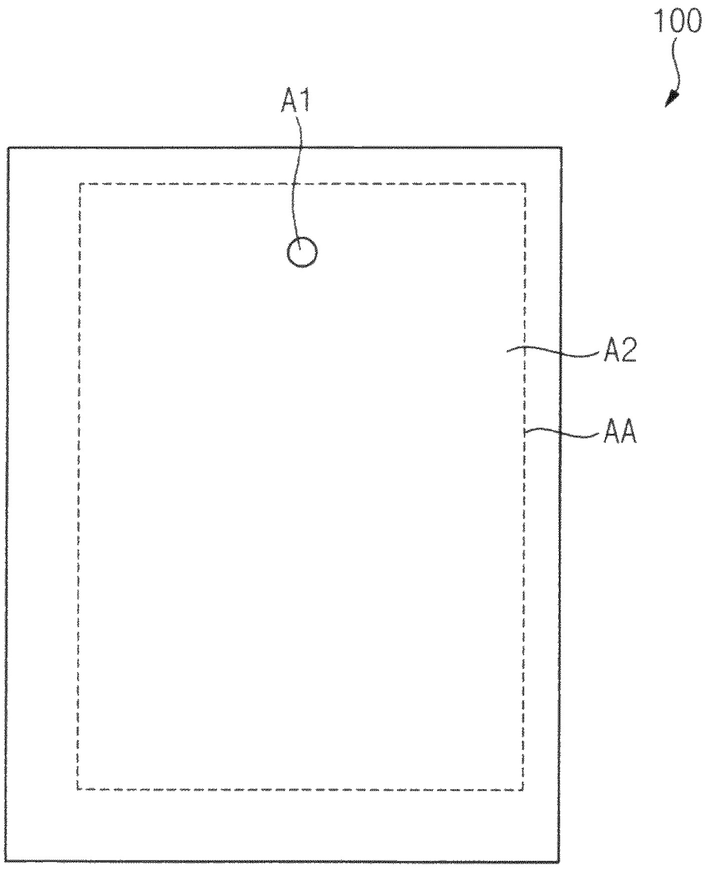
FIG. 2 is a diagram illustrating an example of a display panel of the display device of FIG. 1.
Figure 3:
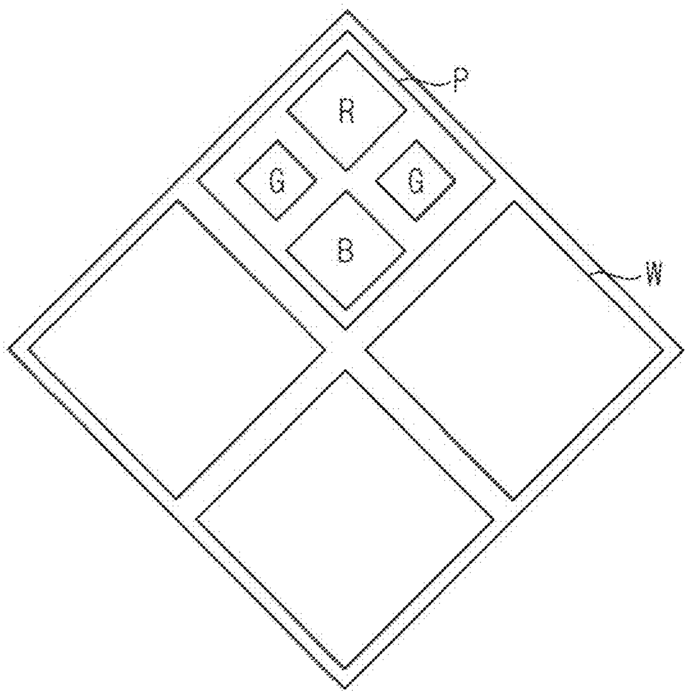
FIG. 3 is a diagram illustrating an example of a first pixel structure of the display device of FIG. 1.
Figure 4:
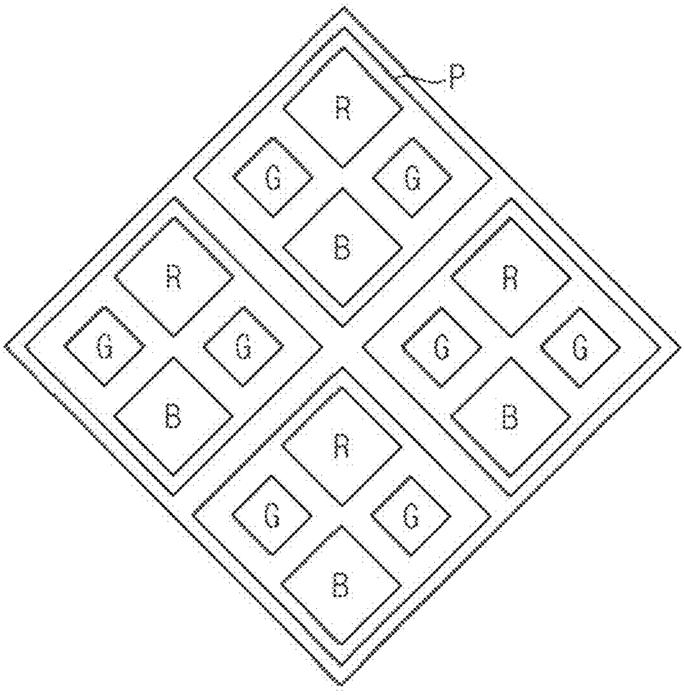
FIG. 4 is a diagram illustrating an example of a second pixel structure of the display device of FIG. 1.

FIG. 2 is a diagram illustrating an example of the display panel 100 of the display device 1000 of FIG. 1, FIG. 3 is a diagram illustrating an example of a first pixel structure of the display device 1000 of FIG. 1, and FIG. 4 is a diagram illustrating an example of a second pixel structure of the display device 1000 of FIG. 1.

Referring to FIGS. 1 to 4, the display panel 100 may include a first region A1 having the first pixel structure and a second region A2 having the second pixel structure different from the first pixel structure. In an embodiment, an optical module may be disposed under the first region A1. The optical module may be a module using optics. For example, the optical module may include a camera module, an iris recognition module, an optical fingerprint recognition module, an infrared module, or the like.

The pixels P may be disposed in the first region A1 and the second region A2. However, the first region A1 and the second region A2 may have different pixel structures. In the case of the first region A1, since the optical module takes a picture, a transmission window W may be formed between the pixels P. For example, the number of pixels per unit area of the first pixel structure may be smaller than the number of pixels per unit area of the second pixel structure. In an embodiment, for example, the number of pixels per unit area of the second pixel structure is equal to or more than 4 times of the number of pixels per unit area of the first pixel structure.

In an embodiment, for example, the first pixel structure may include one pixel P and three transmission windows W. Each of the pixels P may include a first color sub-pixel R, a second color sub-pixel G, and a third color sub-pixel B. For example, the second pixel structure may include four pixels P. For example, the second color sub-pixel G may be smaller than each of the first color sub-pixel R and the third color sub-pixel B. However, the pixel structure of FIGS. 3 and 4 is only an example, and the pixel structure according to the invention is not limited thereto.

Figure 5:
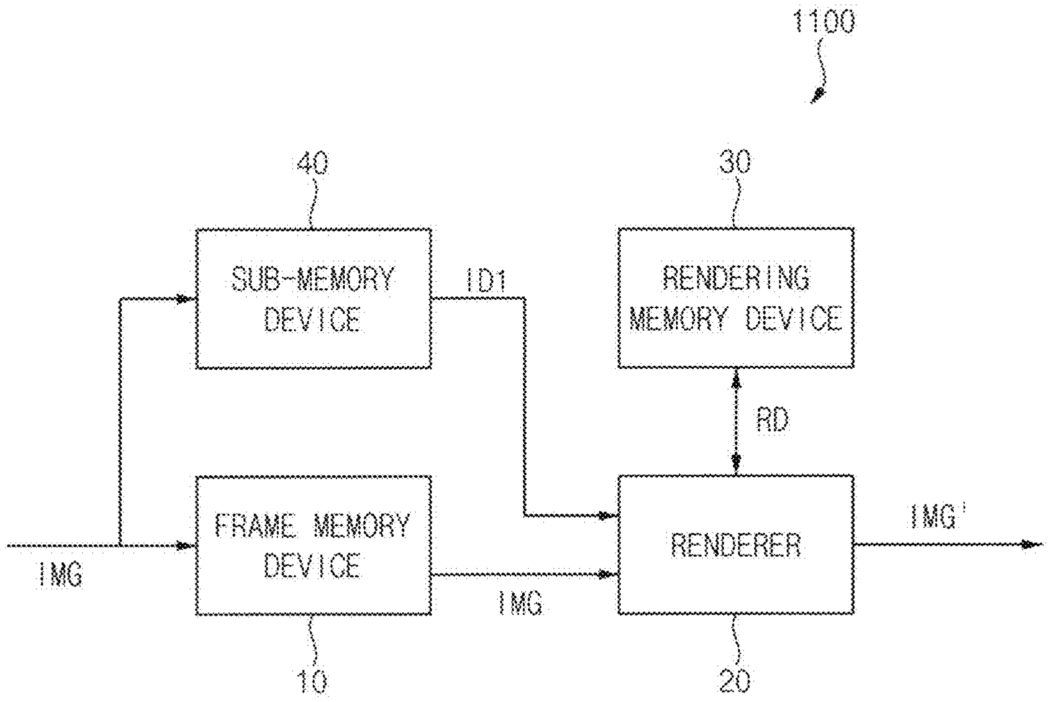
FIG. 5 is a block diagram illustrating an example of a display panel driver of the display device of FIG. 1.
Figure 6:
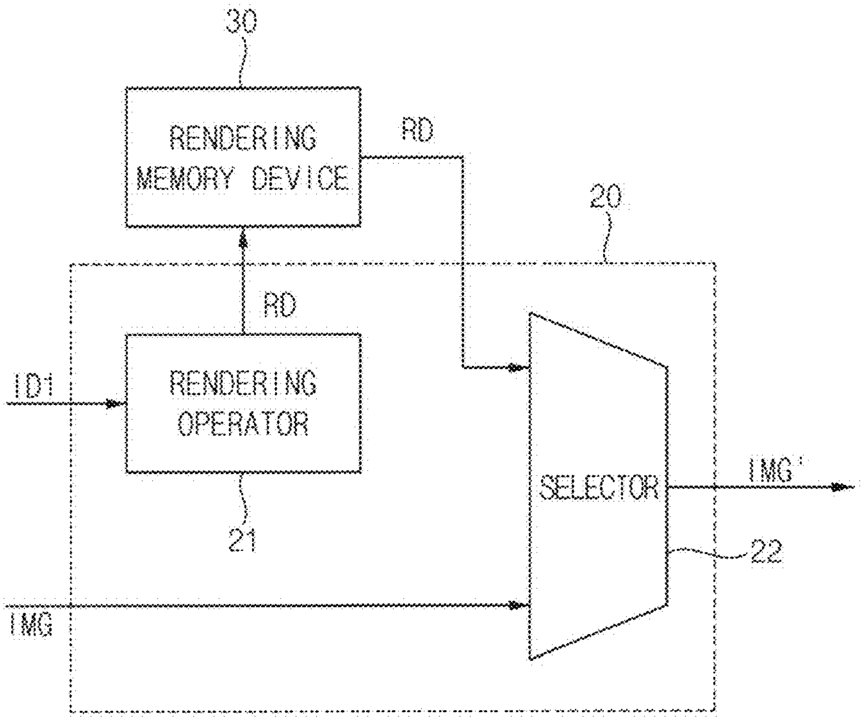
FIG. 6 is a block diagram illustrating an example of a renderer and a rendering memory device of the display device of FIG. 1.
Figure 7:
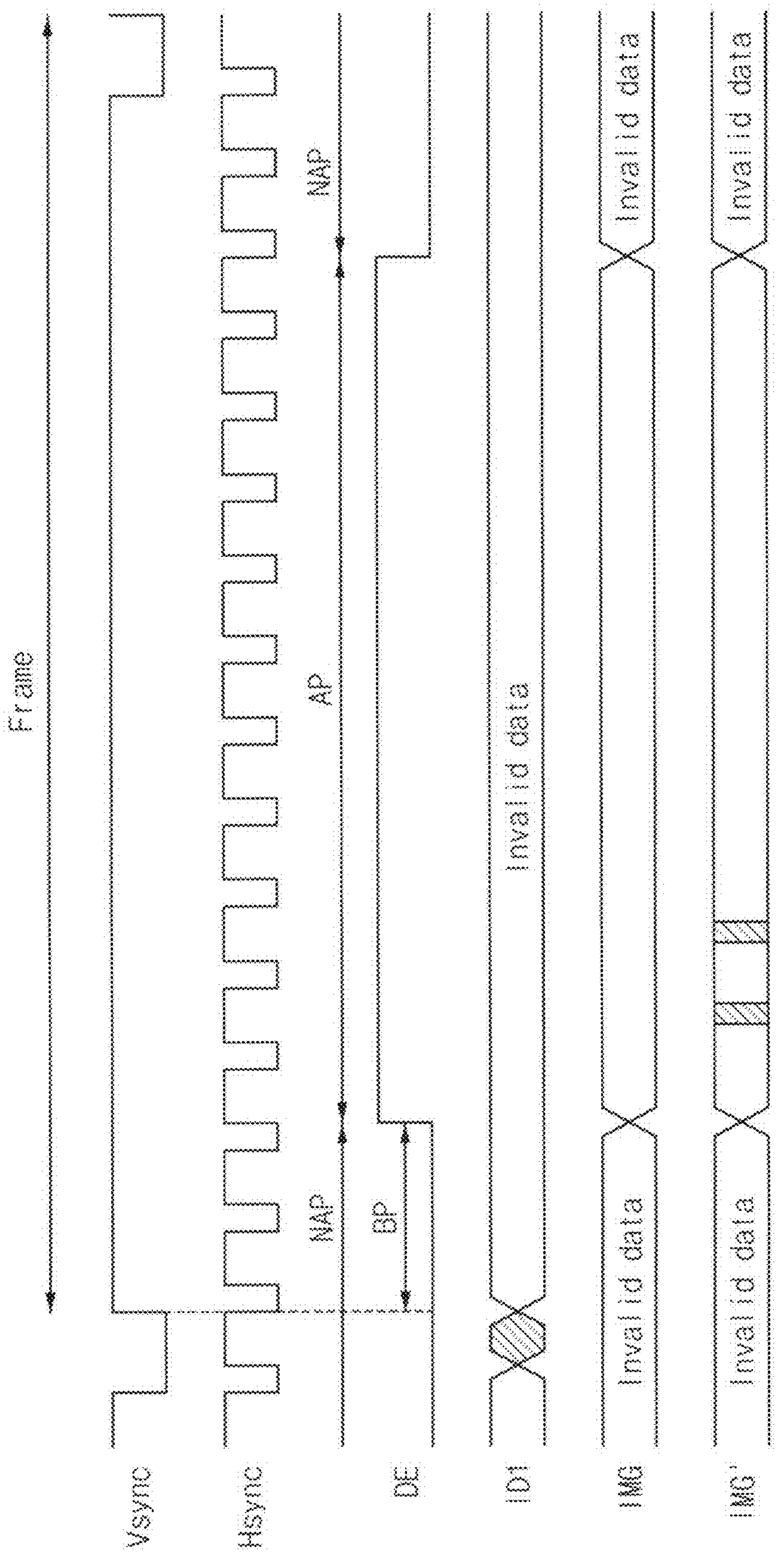
FIG. 7 is a timing diagram illustrating an example in which the display device of FIG. 1 performs rendering.

FIG. 5 is a block diagram illustrating an example of a display panel driver 1100 of the display device 1000 of FIG. 1, FIG. 6 is a block diagram illustrating an example of a renderer 20 and a rendering memory device 30 of the display device 1000 of FIG. 1, and FIG. 7 is a timing diagram illustrating an example in which the display device 1000 of FIG. 1 performs rendering.

Referring to FIGS. 1, 2, 5, and 6, the display panel driver 1100 may render first region data ID1 corresponding to the first region A1 among the input image data IMG to generate rendering data RD in an inactive period NAP of a data enable signal DE, and generate the data voltages applied to the first region A1 based on the rendering data RD in an active period AP of the data enable signal DE.

The display panel driver 1100 may include a frame memory device 10 for storing the input image data IMG, a renderer 20 for rendering the first region data ID1 in the inactive period NAP to generate the rendering data RD, and a rendering memory device 30 for storing the rendering data RD. The display panel driver 1100 may further include a sub-memory device 40 for storing the first region data ID1. In an embodiment, the driving controller 200 may include the frame memory device 10, the renderer 20, the rendering memory device 30, and the sub-memory device 40. In another embodiment, the driving controller 200 may include the renderer 20, and not include the frame memory device 10, the rendering memory device 30, and the sub-memory device 40.

The frame memory device 10 may store the input image data IMG of one frame. The frame memory device 10 may output the stored input image data IMG to the renderer 20. In another embodiment, the input image data IMG stored in the frame memory device 10 may be applied to the renderer 20 after data processing. For example, the data processing may include, but is not limited to, pentile data conversion for converting RGB image data into image data suitable for a pentile pixel structure, luminance compensation, and color correction, etc.

The sub-memory device 40 may store the first region data ID1 corresponding to the first region A1 of the input image data IMG. The sub-memory device 40 may receive the input image data IMG and store only the first region data ID1 among the input image data IMG. The first region data ID1 may be data for a displayed image in the first region A1.

The renderer 20 may include a rendering operator 21 for rendering the first region data ID1, and a selector 22 for selectively outputting the rendering data RD or the input image data IMG.

The rendering operator 21 may generate the rendering data RD by rendering the first region data ID1. As described above, the first pixel structure of the first region A1 may be different from the second pixel structure of the second region A2. Accordingly, the rendering operator 21 may render the first region data ID1 to be suitable for the first pixel structure. That is, the rendering operator 21 may perform image processing on the first region data ID1 to display a corresponding image on the first region A1 having the first pixel structure.

The rendering operator 21 may output the rendering data RD to the rendering memory device 30. The rendering memory device 30 may store the rendering data RD and output the rendering data RD to the selector 22. For example, the rendering memory device 30 may receive the rendering data RD in the inactive period NAP and output the rendering data RD in the active period AP.

The selector 22 may receive the rendering data RD and the input image data IMG, and selectively output one of the rendering data RD and the input image data IMG as the rendered input image data IMG'. The rendered input image data IMG' may include the rendering data RD in a part to display an image in the first region A1, and include the input image data IMG in a part to display an image in the second region A2. Accordingly, the display panel driver 1100 may display an image in the first region A1 based on the rendering data RD. The rendered input image data IMG' may become the output image data OIMG through different IPs. In another embodiment, the rendered input image data IMG' may be the output image data OIMG.

Referring to FIGS. 1, 5, and 7, the input control signal CONT may include a vertical synchronization signal Vsync, a horizontal synchronization signal Hsync, and the data enable signal DE. The vertical synchronization signal Vsync may be a reference signal for one screen (i.e., one frame), and an image of one frame may be displayed during a period of the vertical synchronization signal Vsync. The horizontal synchronization signal Hsync may be a reference signal for one line (i.e., one pixel row), and an image of one line may be displayed during a period of the horizontal synchronization signal Hsync. The data enable signal DE may indicate a period in which a display operation (i.e., the data voltages are applied to the display panel 100) is substantially performed. Accordingly, the input image data IMG in the inactive period NAP (i.e., a low level period of the data enable signal DE) may be invalid data The first region data ID1 may be rendered in the inactive period NAP. Since the first region data ID1 is data extracted from the input image data IMG for rendering, a part other than a part on which the rendering is performed (i.e., the colored part of the first region data ID1) may be invalid data.

In an embodiment, the display panel driver 10 may render the first region data ID1 in a back porch period BP of the inactive period NAP. The back porch period BP may be from a time in which the vertical synchronization signal Vsync rises (i.e., rises from a low voltage level to a high voltage level) to a time in which the data enable signal DE rises (i.e., rises from a low voltage level to a high voltage level).

In an embodiment, for example, the rendered first region data ID1 (i.e., the rendering data RD) may be stored in the rendering memory device 30, and be output in the active period AP. Accordingly, the rendered input image data IMG' may include the rendering data RD in a part corresponding to the first region A1 (i.e., a colored part of the rendered input image data IMG'). For example, as shown in FIG. 7, when the first region A1 spans two lines, the rendered input image data IMG' may include the rendering data RD during a period of the horizontal synchronization signal Hsync of 2 clocks.

As described above, since the rendering of the first region data ID1 is performed before the active period AP, there may be little latency in generating the rendered input image data IMG'. Accordingly, power consumption of the display device 1000 may also be reduced.

Figure 8:
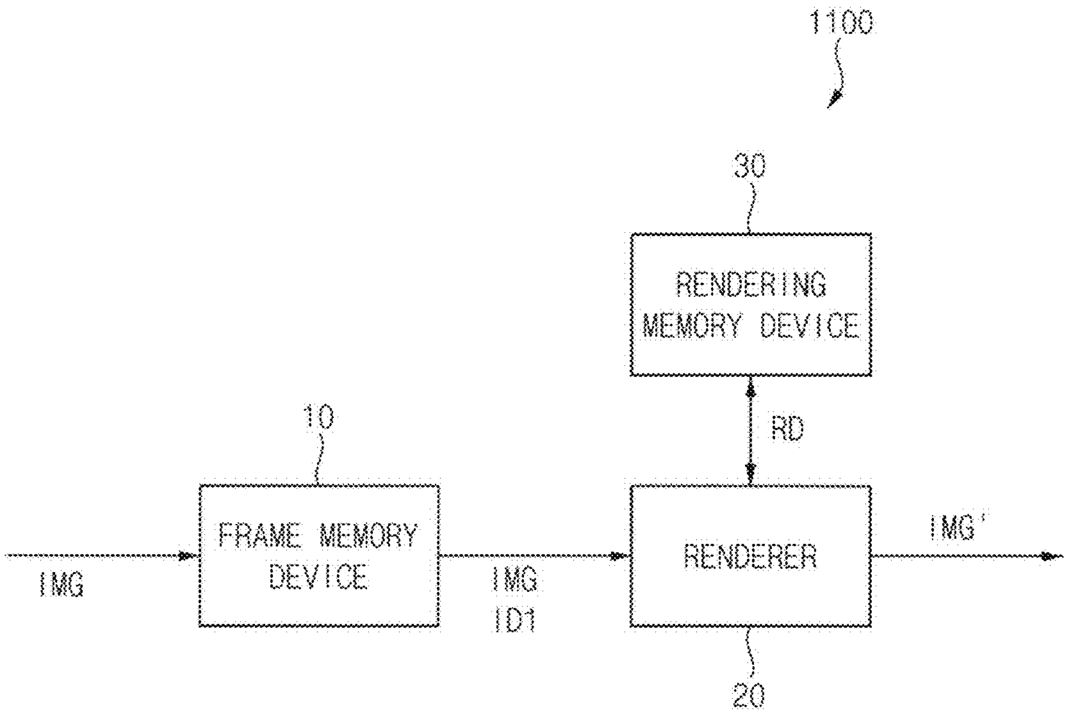
FIG. 8 is a block diagram illustrating a display panel driver of a display device according to embodiments of the present invention.

FIG. 8 is a block diagram illustrating a display panel driver of a display device according to embodiments of the present invention.

The display device according to the present embodiment is substantially the same as the display device 1000 of FIG. 1 except for a process of applying data to the renderer 20. Thus, the same reference numerals are used to refer to the same or similar element, and any repetitive explanation will be omitted.

Referring to FIGS. 1, 2, 7, and 8, the display panel driver 1100 may include the frame memory device 10 for storing the input image data IMG, the renderer 20 for rendering the first region data ID1 in the inactive period NAP to generate the rendering data RD, and the rendering memory device 30 for storing the rendering data RD. The frame memory device 10 may output the first region data ID1 to the renderer 20. In an embodiment, the driving controller 200 may include the frame memory device 10, the renderer 20, and the rendering memory device 30. In another embodiment, the driving controller 200 may include the renderer 20, and not include the frame memory device 10 and the rendering memory device 30.

The frame memory device 10 may store the input image data IMG of one frame. The frame memory device 10 may output the stored input image data IMG to the renderer 20. In another embodiment, the input image data IMG stored in the frame memory device 10 may be applied to the renderer 20 after data processing. For example, the data processing may include, but is not limited to, pentile data conversion for converting RGB image data into image data suitable for a pentile pixel structure, luminance compensation, and color correction, etc.

The frame memory device 10 may output the first region data ID1 to the renderer 20. For example, the frame memory device 10 may output the first region data ID1 to the renderer 20 in the inactive period NAP, and the renderer 20 may render the first region data ID1 in the inactive period NAP.

Figure 9:
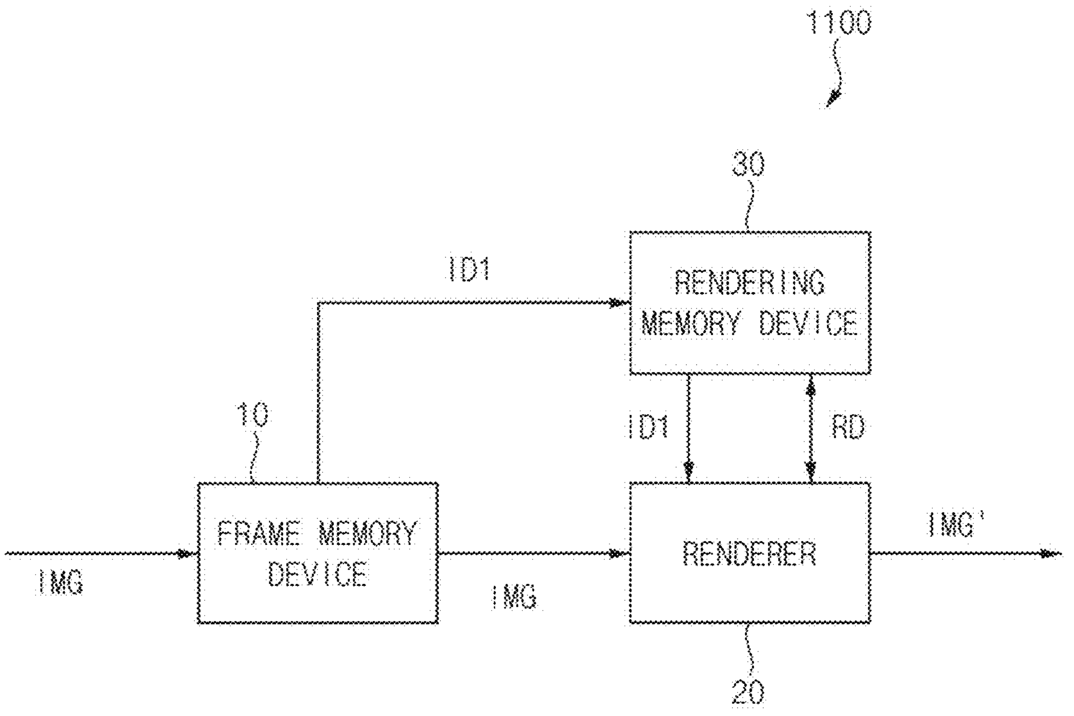
FIG. 9 is a block diagram illustrating a display panel driver of a display device according to embodiments of the present invention.

FIG. 9 is a block diagram illustrating a display panel driver 1100 of a display device according to embodiments of the present invention.

The display device according to the present embodiment is substantially the same as the display device 1000 of FIG. 1 except for a process of applying data to the renderer 20. Thus, the same reference numerals are used to refer to the same or similar element, and any repetitive explanation will be omitted.

Referring to FIGS. 1, 2, 7, and 9, the display panel driver 1100 may include the frame memory device 10 for storing the input image data IMG, the renderer 20 for rendering the first region data ID1 in the inactive period NAP to generate the rendering data RD, and the rendering memory device 30 for storing the rendering data RD. The frame memory device 10 may output the first region data ID1 to the rendering memory device 30, and the rendering memory device 30 may output the first region data ID1 to the renderer 20. In an embodiment, the driving controller 200 may include the frame memory device 10, the renderer 20, and the rendering memory device 30. In another embodiment, the driving controller 200 may include the renderer 20, and not include the frame memory device 10 and the rendering memory device 30.

The frame memory device 10 may store the input image data IMG of one frame. The frame memory device 10 may output the stored input image data IMG to the renderer 20. In another embodiment, the input image data IMG stored in the frame memory device 10 may be applied to the renderer 20 after data processing. For example, the data processing may include, but is not limited to, pentile data conversion for converting RGB image data into image data suitable for a pentile pixel structure, luminance compensation, and color correction, etc.

The frame memory device 10 may output the first region data ID1 to the rendering memory device 30. For example, the frame memory device 10 may output the first region data ID1 to the rendering memory device 30, and the rendering memory device 30 may store the first region data ID1. And, the rendering memory device 30 may output the first region data ID1 to the renderer 20 in the inactive period NAP, and the renderer 20 may render the first region data ID1 in the inactive period NAP.

Figure 10:
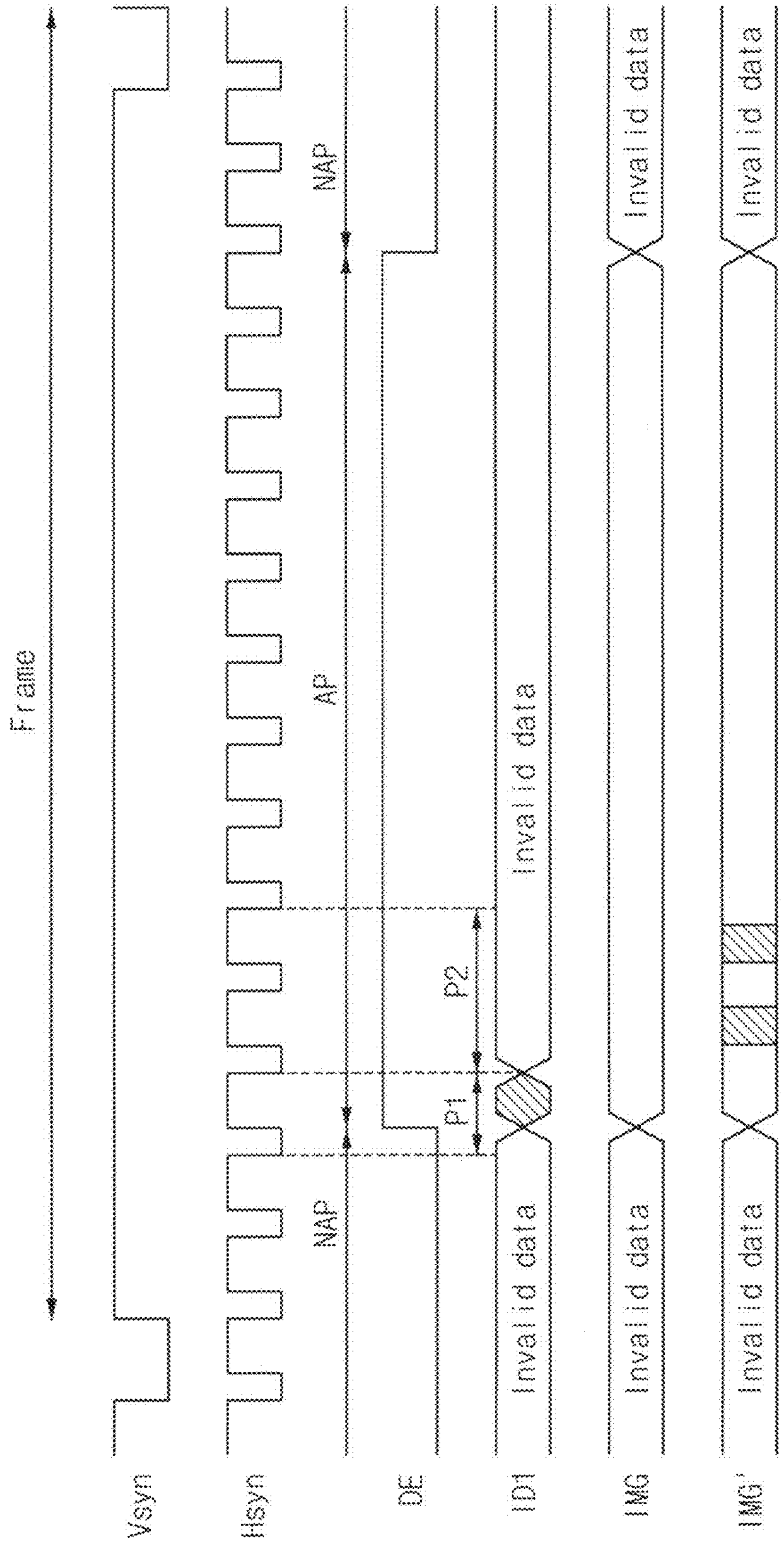
FIG. 10 is a timing diagram illustrating an example in which a display device performs rendering according to embodiments of the present invention.

FIG. 10 is a timing diagram illustrating an example in which a display device performs rendering according to embodiments of the present invention.

The display device according to the present embodiment is substantially the same as the display device 1000 of FIG. 1 except for a timing of the rendering. Thus, the same reference numerals are used to refer to the same or similar element, and any repetitive explanation will be omitted.

Referring to FIGS. 1, 5, and 10, the display panel driver 1100 may render the first region data ID1 corresponding to the first region A1 among the input image data IMG to generate the rendering data RD in a first period P1 of the active period AP of the data enable signal DE, and generate the data voltages applied to the first region A1 based on the rendering data RD in a second period P2 of the active period AP of the data enable signal DE. The second section P2 may be a period in which the display operation is performed on the first region A1.

Accordingly, since the rendering of the first region data ID1 is performed before the display operation is performed on the first region A1, there may be little latency in generating the rendered input image data IMG'. Accordingly, power consumption of the display device may also be reduced.

Figure 11:
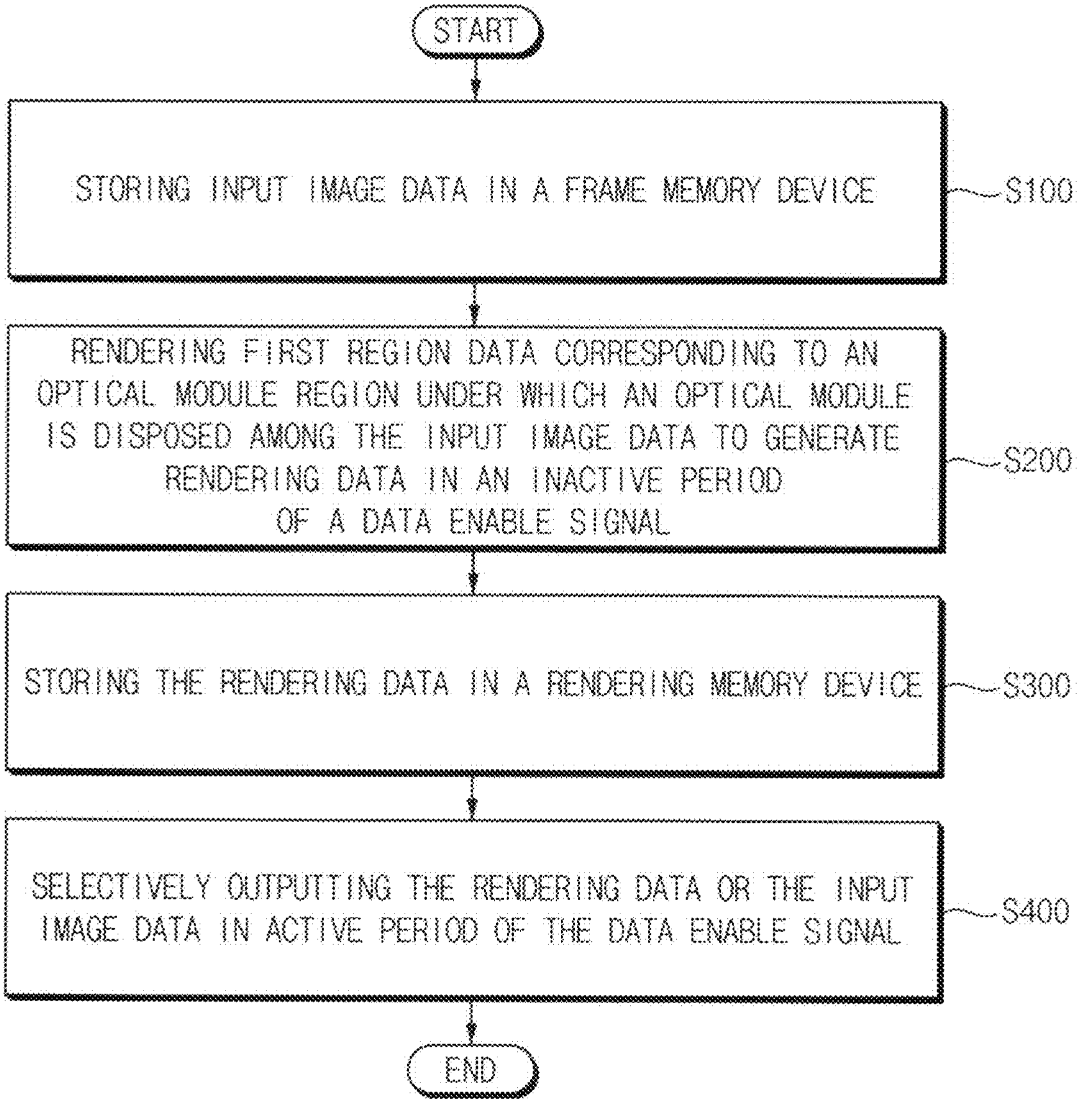
FIG. 11 is a flowchart illustrating a method of driving a display device according to embodiments.

FIG. 11 is a flowchart illustrating a method of driving a display device according to embodiments.

Referring to FIG. 11, the method of FIG. 11 may include storing input image data in a frame memory device (S100); rendering first region data corresponding to an optical module region under which an optical module is disposed among the input image data to generate rendering data in an inactive period of a data enable signal (S200); storing the rendering data in a rendering memory device (S300); and selectively outputting the rendering data or the input image data in active period of the data enable signal (S400).

Specifically, the method of FIG. 11 may store the input image data in the frame memory device (S100). The frame memory device may store the input image data of one frame. The frame memory device may output the stored input image data to the renderer. In another embodiment, the input image data stored in the frame memory device may be applied to the renderer 20 after data processing. For example, the data processing may include, but is not limited to, pentile data conversion for converting RGB image data into image data suitable for a pentile pixel structure, luminance compensation, and color correction, etc.).

Specifically, the method of FIG. 11 may include: rendering first region data corresponding to an optical module region under which an optical module is disposed among the input image data to generate rendering data in an inactive period of a data enable signal (S200).

A pixel structure of the optical module region may be different from a pixel structure of a normal region under which the optical module is not disposed. The pixels may be disposed in the optical module region and the normal region. However, the optical module region and the normal region may have different pixel structures. In the case of the optical module region, since the optical module takes a picture, a transmission window may be formed between the pixels. For example, the number of pixels per unit area of the pixel structure of the optical module region may be smaller than the number of pixels per unit area of the pixel structure of the normal region.

The rendering of the first region data may be performed in the back porch period of the inactive period. Accordingly, the rendering of the first region data may be performed before the active period of the data enable signal.

Specifically, the method of FIG. 11 may include: storing the rendering data in a rendering memory device (S300). The rendering memory device may store the first region data. The rendering memory device may output the first region data in the inactive period, the output first region data may be rendered, and the rendering data generated by rendering the first region data may be stored in the rendering memory device. The rendering memory device may output the rendering data in the active period of the data enable signal.

Specifically, the method of FIG. 11 may include selectively outputting the rendering data or the input image data in active period of the data enable signal (S400). Accordingly, the display operation may be performed in the optical module region based on the rendering data, and the display operation may be performed in the normal region based on the input image data.

Figure 12:
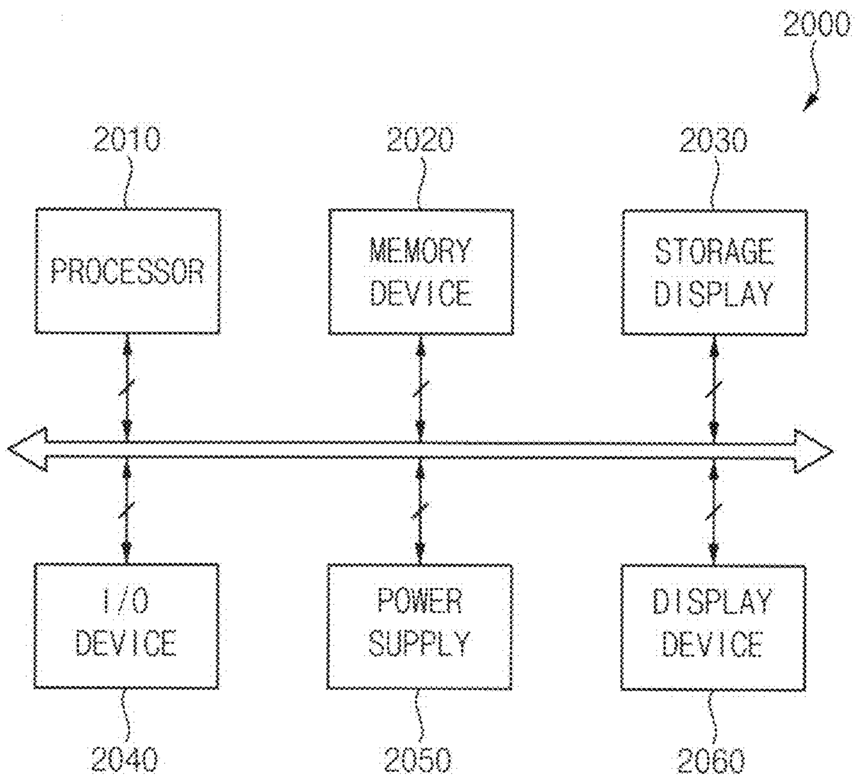
FIG. 12 is a block diagram showing an electronic device according to embodiments.
Figure 13:
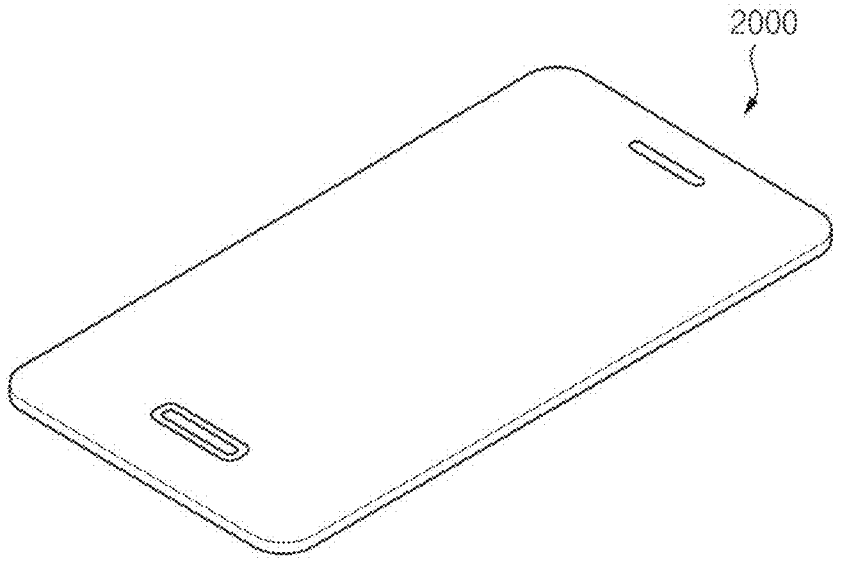
FIG. 13 is a diagram showing an example in which the electronic device of FIG. 11 is implemented as a smart phone.

FIG. 12 is a block diagram showing an electronic device according to embodiments, and FIG. 13 is a diagram showing an example in which the electronic device of FIG. 12 is implemented as a smart phone.

Referring to FIGS. 12 and 13, the electronic device 2000 may include a processor 2010, a memory device 2020, a storage device 2030, an input/output ("I/O") device 2040, a power supply 2050, and a display device 2060. Here, the display device 2060 may be the display device 1000 of FIG. 1. In addition, the electronic device 2000 may further include a plurality of ports for communicating with a video card, a sound card, a memory card, a universal serial bus ("USB") device, other electronic devices, etc. In an embodiment, as shown in FIG. 13, the electronic device 2000 may be implemented as a smart phone. However, the electronic device 2000 is not limited thereto. For example, the electronic device 2000 may be implemented as a cellular phone, a video phone, a smart pad, a smart watch, a tablet PC, a car navigation system, a computer monitor, a laptop, a head mounted display ("HMD") device, etc.

The processor 2010 may perform various computing functions. The processor 2010 may be a microprocessor, a central processing unit ("CPU"), an application processor ("AP"), etc. The processor 2010 may be coupled to other components via an address bus, a control bus, a data bus, etc. Further, the processor 2010 may be coupled to an extended bus such as a peripheral component interconnection ("PCI") bus.

As used in connection with various embodiments of the disclosure, the renderer 20 may be implemented in hardware, software, or firmware, for example, implemented in a form of an application-specific integrated circuit (ASIC) or the processor 2010.

The memory device 2020 may store data for operations of the electronic device 2000. For example, the memory device 2020 may include at least one non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, etc., and/or at least one volatile memory device such as a dynamic random access memory ("DRAM") device, a static random access memory ("SRAM") device, a mobile DRAM device, etc.

The storage device 2030 may include a solid state drive ("SSD") device, a hard disk drive ("HDD") device, a CD-ROM device, etc. The I/O device 2040 may include an input device such as a keyboard, a keypad, a mouse device, a touch pad, a touch screen, etc., and an output device such as a printer, a speaker, etc. In some embodiments, the I/O device 2040 may include the display device 2060. The power supply 2050 may provide power for operations of the electronic device 2000. For example, the power supply 2050 may be a power management integrated circuit ("PMIC").

The display device 2060 may display an image corresponding to visual information of the electronic device 2000. For example, the display device 2060 may be an organic light emitting display device or a quantum dot light emitting display device, but is not limited thereto. The display device 2060 may be coupled to other components via the buses or other communication links. Here, the display device 2060 may generate rendering data in advance in an active period of a data enable signal by rendering first region data corresponding to the first region among input image data to generate the rendering data in an inactive period of the data enable signal, and generating data voltages applied to the first region based on the rendering data in the active period of the data enable signal. Accordingly, the display device may match output timing of a part corresponding to a first region and a part not corresponding to the first region. Since these are described above, duplicated description related thereto will not be repeated.

The inventions may be applied to any electronic device including the display device. For example, the inventions may be applied to a television ("TV"), a digital TV, a 3D TV, a mobile phone, a smart phone, a tablet computer, a virtual reality ("VR") device, a wearable electronic device, a personal computer ("PC"), a home appliance, a laptop computer, a personal digital assistant ("PDA"), a portable multimedia player ("PMP"), a digital camera, a music player, a portable game console, a navigation device, etc.

The foregoing is illustrative of the present invention and is not to be construed as limiting thereof. Although a few exemplary embodiments of the present invention have been described, those skilled in the art will readily appreciate that many modifications are possible in the exemplary embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific exemplary embodiments disclosed, and that modifications to the disclosed exemplary embodiments, as well as other exemplary embodiments, are intended to be included within the scope of the appended claims. The present invention is defined by the following claims, with equivalents of the claims to be included therein.

What is claimed is:

1. A display device comprising:

a display panel including a first region having a first pixel structure and a second region having a second pixel structure different from the first pixel structure; and a display panel driver configured to render first region data corresponding to the first region among input image data to generate rendering data in an inactive period of a data enable signal, and to generate data voltages applied to the first region based on the rendering data in an active period of the data enable signal.

2. The display device of claim 1, wherein an optical module is disposed under the first region.

3. The display device of claim 1, wherein a total number of pixels per unit area of the first pixel structure is smaller than a total number of pixels per unit area of the second pixel structure.

4. The display device of claim 1, wherein the display panel driver is configured to render the first region data in a back porch period of the inactive period.

5. The display device of claim 1, wherein the display panel driver includes:

a frame memory device configured to store the input image data;

a renderer configured to render the first region data in the inactive period to generate the rendering data; and a rendering memory device configured to store the rendering data.

6. The display device of claim 5, wherein the renderer includes:

a rendering operator configured to render the first region data; and a selector configured to selectively output the rendering data or the input image data.

7. The display device of claim 5, wherein the display panel driver further includes:

a sub-memory device configured to receive the input image data and store the first region data of the input image data.

8. The display device of claim 5, wherein the frame memory device is configured to output the first region data to the renderer.

9. The display device of claim 5, wherein the frame memory device is configured to output the first region data to the rendering memory device, and wherein the rendering memory device is configured to output the first region data to the renderer.

10. A method of driving a display device comprising:

storing input image data in a frame memory device;

rendering first region data corresponding to an optical module region under which an optical module is disposed among the input image data to generate rendering data in an inactive period of a data enable signal;

storing the rendering data in a rendering memory device; and selectively outputting the rendering data or the input image data in active period of the data enable signal.

11. The method of claim 10, wherein a pixel structure of the optical module region is different from a pixel structure of a normal region under which the optical module is not disposed.

12. The method of claim 10, wherein rendering the first region data is performed in a back porch period of the inactive period.

* * * * *